United States Patent
Fried

(10) Patent No.: US 6,739,593 B2
(45) Date of Patent: May 25, 2004

(54) DEVICE FOR REDUCING THE SEALING GAP BETWEEN A ROTATING COMPONENT AND A STATIONARY COMPONENT INSIDE A ROTARY TURBO-ENGINE THROUGH WHICH A FLOW PASSES AXIALLY

(75) Inventor: Reinhard Fried, Nussbaumen (CH)

(73) Assignee: Alstom Technology Ltd., Baden (CH)

( * ) Notice: Subject to any disclaimer, the term of this patent is extended or adjusted under 35 U.S.C. 154(b) by 40 days.

(21) Appl. No.: 10/014,349

(22) Filed: Dec. 14, 2001

(65) Prior Publication Data

US 2002/0109303 A1 Aug. 15, 2002

(30) Foreign Application Priority Data

Dec. 16, 2000 (DE) .......................... 100 62 909

(51) Int. Cl.⁷ .......................... F16D 11/02; F16J 15/453
(52) U.S. Cl. .......................... 277/411; 277/414; 277/415
(58) Field of Search ................ 277/411, 409, 277/414, 415

(56) References Cited

U.S. PATENT DOCUMENTS

| 3,365,172 | A | * | 1/1968 | McDonough et al. ........ 415/117 |
| 3,603,599 | A | * | 9/1971 | Laird .......................... 277/414 |
| 4,207,024 | A | * | 6/1980 | Bill et al. .................. 415/173.4 |
| 4,218,066 | A | * | 8/1980 | Ackermann .................. 277/414 |
| 4,460,185 | A | * | 7/1984 | Grandey ...................... 277/415 |
| 4,594,053 | A | * | 6/1986 | Sohngen ...................... 277/414 |
| 5,096,376 | A | * | 3/1992 | Mason et al. ............. 415/173.5 |
| 5,178,529 | A | * | 1/1993 | Obrist et al. ................. 277/411 |
| 5,883,314 | A |   | 3/1999 | Sievers et al. |
| 5,976,695 | A | * | 11/1999 | Hajmrle et al. ............. 428/402 |
| 6,485,025 | B1 | * | 11/2002 | Hammersley et al. ...... 277/414 |

FOREIGN PATENT DOCUMENTS

| EP | 0837222 A1 | 4/1996 |
| GB | 2128261 A | 4/1984 |
| GB | 2310895 A | 9/1997 |

* cited by examiner

Primary Examiner—Anthnoy Knight
Assistant Examiner—Michael J. Kyle
(74) Attorney, Agent, or Firm—Burns, Doane, Swecker & Mathis, L.L.P.

(57) ABSTRACT

A device for reducing the sealing gap between a rotating component and a stationary component inside a rotary turbo-engine through which a flow passes axially and in which the rotating component and the stationary component each have a surface portion arranged separated by a sealing gap and providing sealing structures on at least one of the two surface portions, one of the sealing structures being an abradable planar sealing structure. The surface portion opposite the abradable planar sealing structure likewise has an abradable planar sealing structure, and the two sealing structures bound the sealing gap in a planar manner.

4 Claims, 4 Drawing Sheets a) b)

a) b) (Stand der Technik)

DEVICE FOR REDUCING THE SEALING GAP BETWEEN A ROTATING COMPONENT AND A STATIONARY COMPONENT INSIDE A ROTARY TURBO-ENGINE THROUGH WHICH A FLOW PASSES AXIALLY

FIELD OF THE INVENTION

The invention relates to a device for reducing the sealing gap between a rotating component and a stationary component inside a rotary turbo-engine through which a flow passes axially and in which the rotating component and the stationary component each have a surface portion arranged separated by a sealing gap and providing sealing structures on at least one of the two surface portions, one of the sealing structures being an abradable planar sealing structure.

BACKGROUND OF THE INVENTION

In the attempt to optimize the efficiency of rotary turbo-engines, for example compressor units and in particular gas-turbine stages, any processes resulting in losses are as far as possible completely eliminated or at least minimized. Processes resulting in losses are caused inter alia by sealing gaps between the rotating component and the stationary component of a plant which have to be set to the minimum in order to reduce the leakage flows which pass through the sealing gaps and which do not assist the energy conversion.

Labyrinth seals are known from gas-turbine technology; they comprise intermeshing sealing strips and are each attached to mutually opposed surface portions of the rotating and stationary components of the plant and in turn help to minimize the leakage flows. In addition, rib-shaped, step-shaped or honeycomb-shaped sealing structures are known which are used to reduce the sealing gap in the same way. FIG. 2 with its alternative illustrations a to e shows conventional, known sealing structures and their combinations. In all the illustrations of FIGS. 2a to 2e it is to be assumed that the upper component 1 rotates relative to the lower component 2 of the plant. In the case of FIG. 2a the surface portions 3 and 4 form a sealing gap 5 and, in addition, on their surfaces they have web-like, mutually intermeshing raised portions 6 which form a labyrinth seal known per se. In FIG. 2b the surface portion 3 of the rotating component 1 has three rib structures 8 attached to it, opposite which is arranged a honeycomb structure 7 which is secured to the stationary component 2. In this case the sealing gap 5 is bounded locally by the narrow points between the rib structures 8 and the honeycomb structure 7.

In order to be able to set to a minimum the distance between the rib structures 8 and the surface 71 of the sealing structure 7 which is attached to the surface portion 4 of the stationary component 2, as shown in FIG. 2c the planar sealing structure 7 is constructed in the form of an abradable layer 9 so that the rib structures 8 which usually have an abrasive effect wear the abradable layer 9 locally during contact, as a result of which a minimal sealing gap is formed between the rib structures 8 and the surface 91 of the abradable layer 9. In addition, it should be mentioned at this point that the honeycomb structure can also have abradable properties.

In addition, stepped sealing-gap structures are known, as may be seen in FIGS. 2d and 2e, in which the rotating component 1 and the stationary component 2 have stepped surface portions with corresponding sealing structures. In FIG. 2d rib structures 8 are again attached opposite planar honeycomb structures 7, whereas in FIG. 2e rib structures 8 are arranged opposite abradable layers 9.

Irrespective of the multiplicity of known designs of sealing structures and the known combinations thereof, the desire nevertheless remains to have improved possibilities of reducing the sealing gap or of reducing the leakage flow occurring through the sealing gap.

SUMMARY OF THE INVENTION

The object of the invention is to design a device for reducing the sealing gap between a rotating component and a stationary component inside a rotary turbo-engine through which a flow passes axially and in which the rotating component and the stationary component each have a surface portion arranged separated by a sealing gap and providing sealing structures on at least one of the two surface portions, one of the sealing structures being an abradable planar sealing structure, in such a way that the flow resistance through the sealing gap is to be further increased and the leakage flow associated therewith is to be significantly reduced. In addition, the steps to be taken should not necessitate a substantial outlay in either structural or financial terms.

If solutions known per se for reducing leakage flows between stationary and rotating components inside a rotary turbo-engine are considered, it is evident that a mutually adjacent arrangement of raised portions designed in the manner of webs or ribs can always be observed on at least one of the two mutually opposed components, as a result of which swirling is induced inside the leakage flows, so as to increase the flow resistance inside the sealing gap in this way. The flow swirls are formed, in particular, immediately downstream of the passage of the leakage flow through the narrow gap behind a rib and, at the same time, produce a perceptible throttling action upon the leakage flow passing through the narrow gap.

In contrast to the known arrangement of sealing structures as described above, the invention is based on the knowledge that greater throttling loss in the leakage flow can be caused by the structural provision of a long and narrow sealing gap between the two components movable relative to each other than is the case with conventional sealing structures using projecting rib structures.

Surprisingly, tests have shown that a long and narrow sealing gap, which preferably has a constant minimal sealing dimension in the direction of flow, has considerably better throttling characteristics with respect to the leakage flow than rib structures which are arranged in succession in the direction of flow and which each can enclose a respective narrow gap in the same order of magnitude.

In order to be able to adjust the setting of a minimal sealing gap between two planar sealing structures, the sealing structures are made abradable, so that when they are in mutual contact by corresponding abrasion they form a sealing gap with a minimal dimension.

According to the invention, therefore, a device for reducing the sealing gap according to the preamble of claim 1 is designed in such a way that the surface portion opposite the abradable planar sealing structure likewise has an abradable planar sealing structure and that the two sealing structures bound the sealing gap in a planar manner.

In a preferred embodiment the device according to the invention for reducing the sealing gap provides two directly opposed planar honeycomb structures as abradables, which are mounted in each case on the rotating and stationary components respectively of the rotary turbo-engine and form a planar narrow sealing gap between themselves. The mutually opposed honeycomb structures have open honeycomb bodies which—on the basis of the current understanding of the throttling effect—contribute in an advantageous manner to the improved throttling action. If a leakage flow occurs in the minimal gap between the mutually opposed honeycomb structures, micro-swirls occur directly on the surface of the individual honeycomb structures and penetrate into the openings of the individual honeycomb openings and are trapped there in the normal manner. In view of the multiplicity of the honeycomb bodies which are opened towards the sealing gap and which in addition bound the sealing gap on both sides, it is possible for the micro-swirling effect—occurring at each individual honeycomb opening—in its entirety with respect to all the honeycomb bodies bounding the sealing gap to throttle or reduce the leakage flow highly effectively.

As an alternative to the use—described above—of planar honeycomb structures as sealing structures, layers of abradable material, which bound the sealing gap between a rotating and a stationary component inside a rotary turbo-engine with a minimal sealing gap, are likewise suitable.

In a manner comparable with the situation—described above—by the provision of honeycomb structures, it is advantageous in the case of so-called abradable planar layers of material if the layers of material have a surface which encloses the sealing gap and which [has] a specific surface roughness or is provided on its surface with a suitably applied micro-surface texturing by which it is possible to produce a micro-swirling of the leakage flow passing through the sealing gap.

Layers of material of this type which are also suitable as abradables are for example MCrAlY material layers which can be applied to the corresponding surface portions of the rotating and stationary components by means of flame spraying and, depending upon the material and flame-spraying parameters selected, have a porosity which results in the desired surface roughness.

By means of the knowledge, according to the invention, of bounding the sealing gap with the aid of planar abradables which result in greater throttling loss than is the case with the rib-like sealing structures known hitherto, sealing structures are possible which are particularly easy to produce and inexpensive to manufacture.

BRIEF DESCRIPTION OF THE DRAWINGS

The invention is described below by way of example with reference to the drawings by way of embodiments without restriction of the general inventive concept. In the drawing FIGS. 1a, b are diagrammatic illustrations of the mode of operation of a sealing arrangement according to the invention.

DETAILED DESCRIPTION OF THE INVENTION

Figure 1:
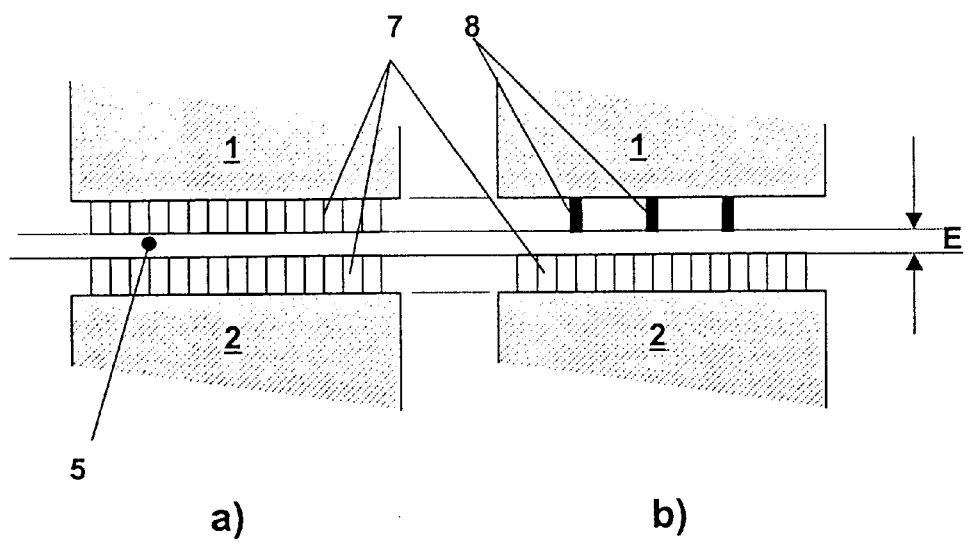

FIGS. 1a and 1b show a comparison between a device designed according to the invention for reducing a gap (FIG. 1a) and a corresponding device known per se (FIG. 1b). As shown in FIG. 1a the rotating and stationary components 1, 2 have a planar honeycomb structure 7 as the sealing structures which together form a sealing gap 5 between themselves. The honeycomb structures 7 designed as abradables can form a minimal sealing gap 5 with respect to each other [on] the two components 1 and 2 after a certain run-in period. Investigations have now shown that the arrangement illustrated in FIG. 1a exerts a significantly greater throttle effect upon a leakage flow passing through the sealing gap 5 than is the case with the previous sealing arrangements as shown in FIG. 1b. Even if the structures 8 designed in the manner of ribs form a narrow gap E which has the same dimensions as the sealing gap 5 in FIG. 1a, comparable throttling effects can nevertheless not be achieved, as in the case of FIG. 1a.

Figure 3:
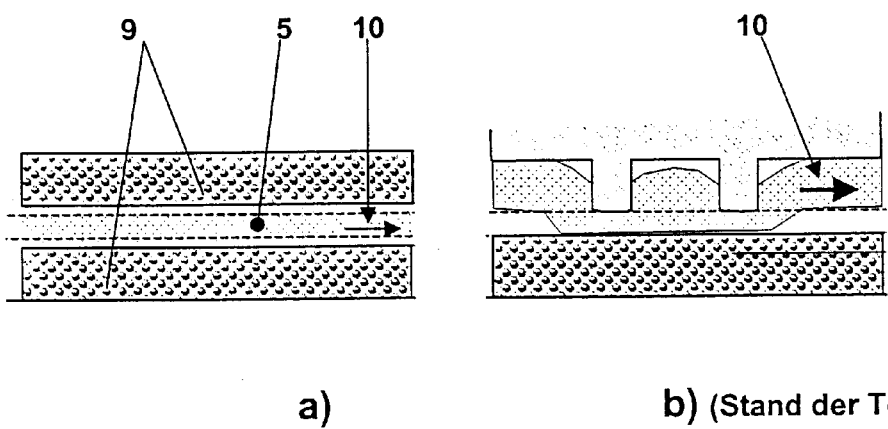
FIGS. 3a, b are illustrations for comparing the throttle effect between a sealing arrangement according to the invention and a previously known sealing arrangement.
Figure 2:
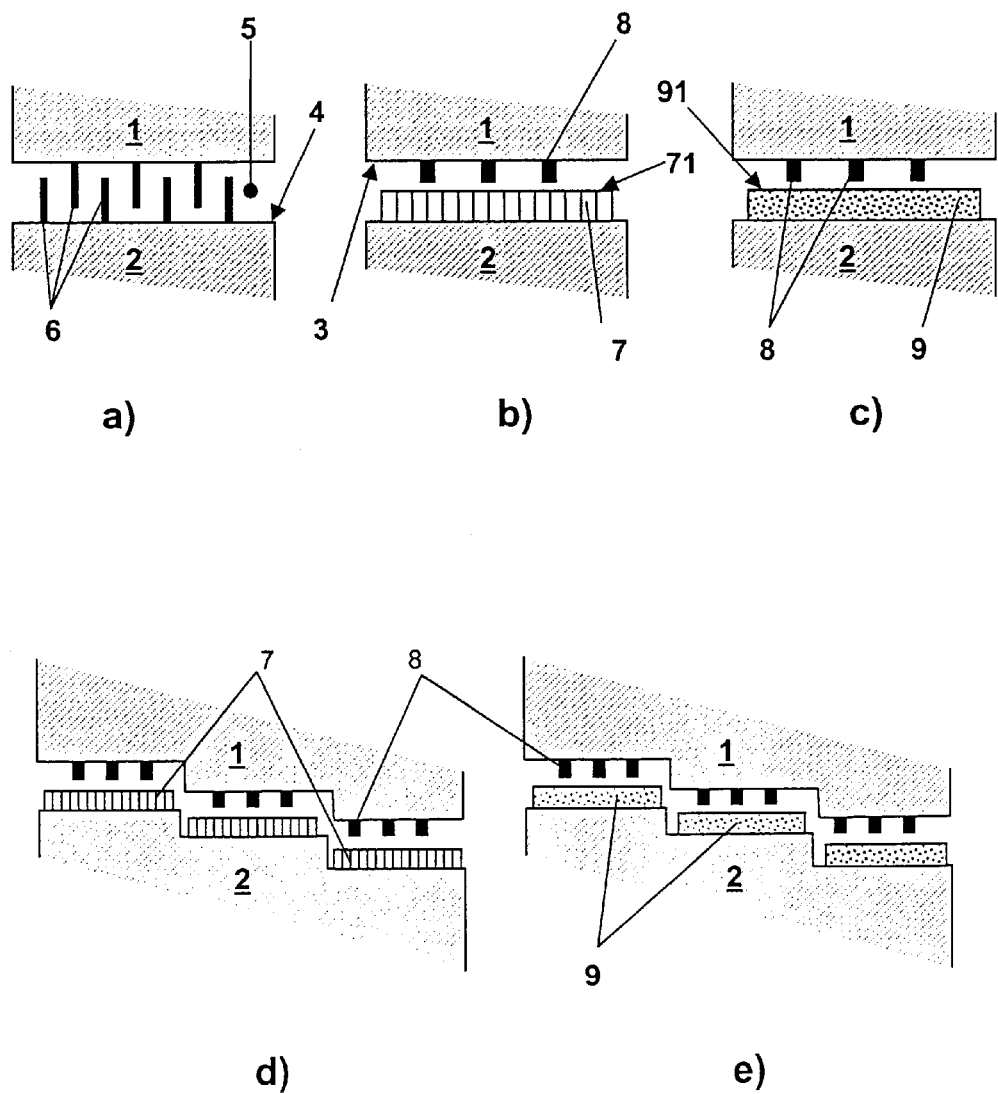
FIGS. 2a to e are illustrations of known sealing arrangements.
Figure 4:
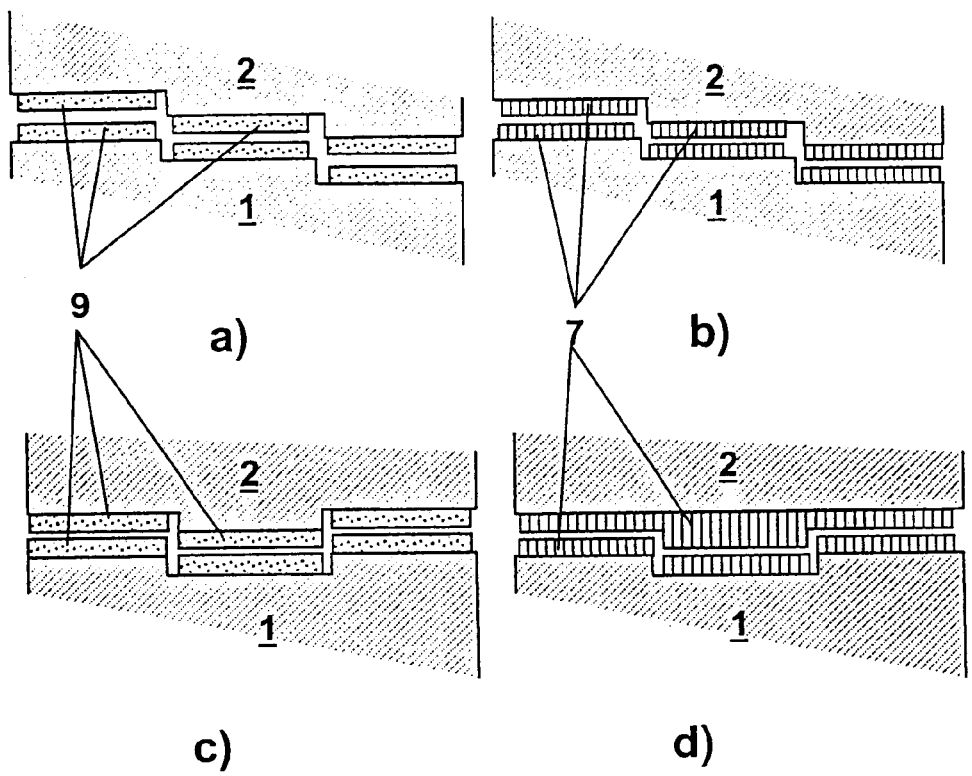
FIGS. 4a to d are variants of further embodiments.

The same also applies to an arrangement of two mutually opposed abradable layers 9 as shown in the diagrammatic cross-sectional illustration of FIG. 3a. Despite a minimal sealing-gap setting, the sealing gap 5 formed by two abradable layers 9 in this case permits a minimal passage of the leakage flow 10 (vide arrow). If the arrangement shown in FIG. 3a is compared with an arrangement known per se using a sealing structure designed in the manner of a double web or rib as shown in the illustration of FIG. 3b, it becomes clear that, despite a narrow-gap setting of equal dimensions, the area of the leakage flow indicated in the case of FIG. 3b takes up a substantially larger proportion by volume than in the case of FIG. 3a. At the same time, this clearly illustrates the considerably better throttle effect which can be achieved with the embodiment in FIG. 3a.

In addition to the provisions, according to the invention, concerning two planar sealing structures which together form a long, narrow sealing gap 5, the embodiments as shown in FIGS. 4a to 4d can additionally increase the throttling effect. In this case the planar portions of the mutually opposed rotating or stationary components 1, 2 are stepped, the individual step portions being provided either with honeycomb structures 7 or with abradable layers 9 which form a minimal sealing gap in a planar manner in part in each case.

Figure 5:
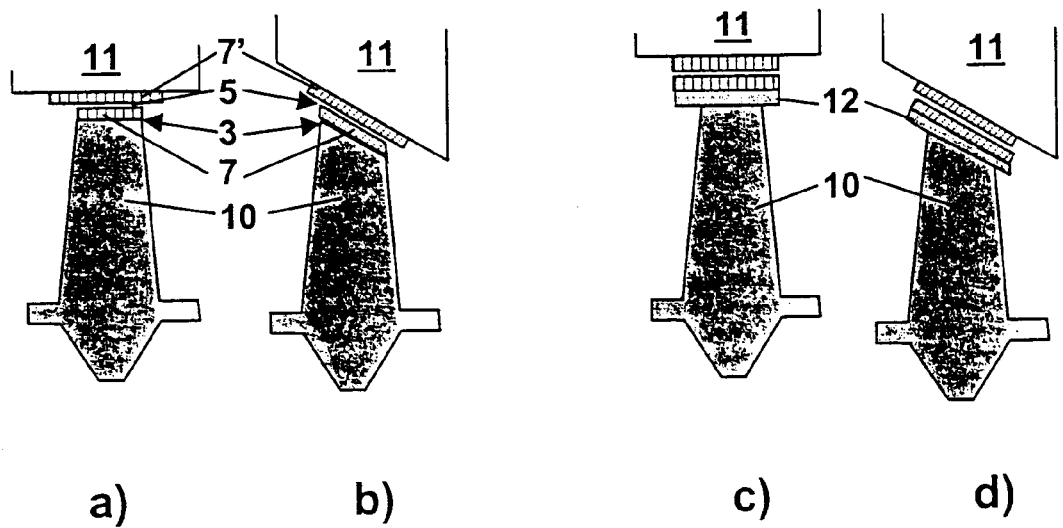
FIGS. 5a to d are illustrations of examples of application on moving vanes and guide vanes of a rotary turbo-engine.

A typical example of application is illustrated diagrammatically in FIG. 5a, in which the upper surface portion 3 of a moving vane 10 of a turbine is completely covered by a honeycomb structure 7. The honeycomb structure 7 of the moving vane 10 is arranged opposite a honeycomb structure 7' formed with a larger area and forms a narrow sealing gap 5 with the latter. The honeycomb structure 7' is applied to a heat shield 11 arranged stationary inside a rotary turbo-engine, for example a compressor unit or a gas-turbine stage.

A corresponding vane arrangement is illustrated in FIG. 5b, but it has an obliquely extending surface portion with a heat-shield arrangement situated parallel thereto in a corresponding manner.

In the same way, FIGS. 5c and 5d show moving vanes 10 with a covering strip 12 to which a corresponding honeycomb structure 5 is applied.

Figure 6:
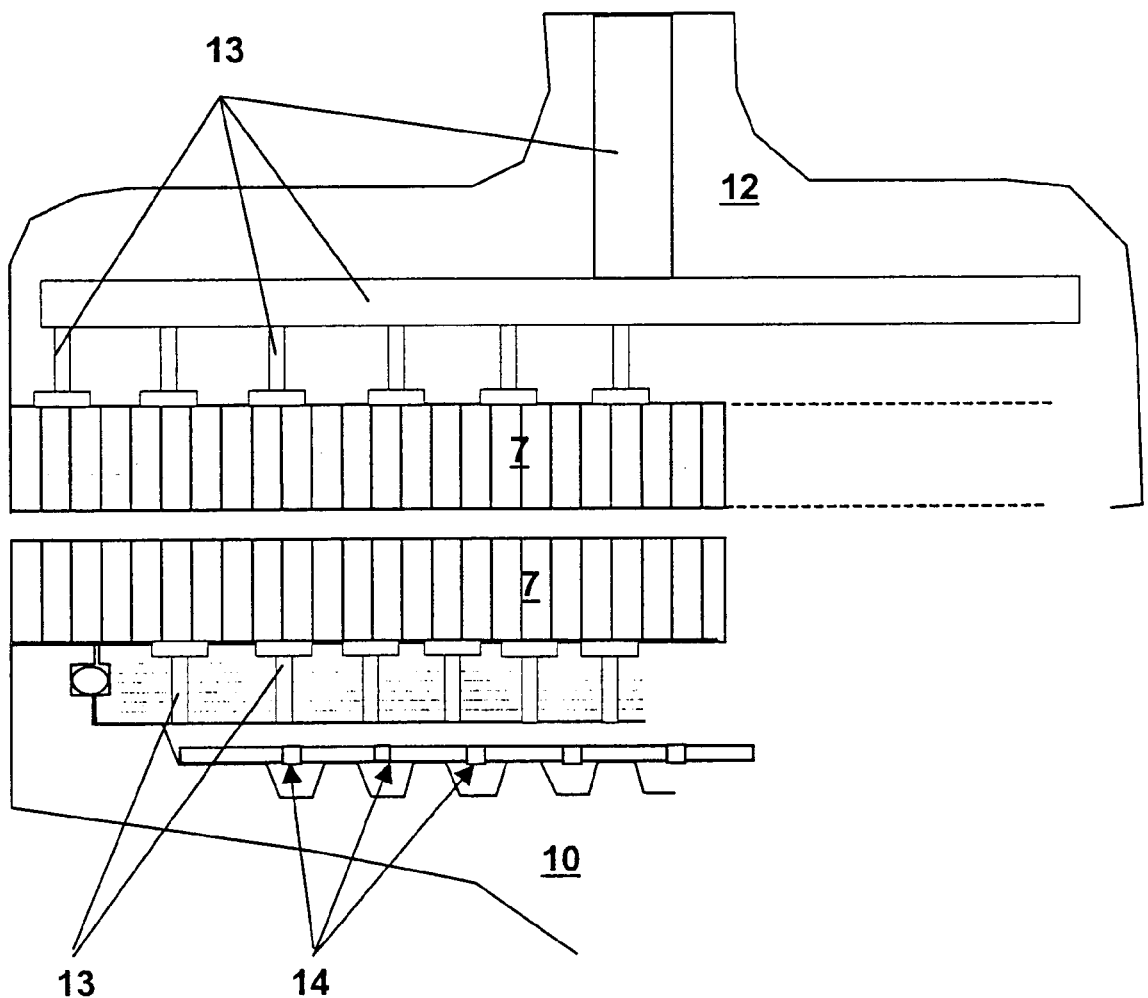
FIG. 6 is a diagrammatic cross-sectional illustration of a moving vane with respect to a heat shield mounted stationary inside a gas-turbine stage.

Finally, FIG. 6 shows a diagrammatic cross-section through a stationary heat shield 12 which is provided with a honeycomb structure 7. A moving vane 10 with a correspondingly designed honeycomb structure 7 is arranged opposite the heat shield 12. In both cases the honeycomb structure 7 is supplied with cooling air by means of a plurality of individual cooling-air ducts 13. In the case of the moving vane 10 the cooling air supplied in the cooling-air ducts 13 is additionally conveyed by way of a baffle cooling-air arrangement 14, as a result of which the cooling air is conveyed at high speed in the direction towards the honeycomb structure to be cooled.

Further effects which assist the throttling effect may be observed through the supply of cooling air and the issue thereof out of the honeycomb structure and into the sealing gap.

LIST OF REFERENCES 1 rotating component
2 stationary component
3, 4 surface portions
5 sealing gap
6 labyrinth seals
7 honeycomb structure
8 rib-like sealing structures
9 abradable material layer (abradable)
91 upper side of the abradable
10 moving vane
11 heat shield
12 covering strip
13 cooling ducts
14 baffle cooling-air arrangement

What is claimed is:

1. A device for reducing the sealing gap between a rotating component and a stationary component inside a rotary turbo-engine through which a flow passes axially, the, device comprising:
   a first planar sealing structure arranged on the rotating component,
   a second planar sealing structure arranged on the stationary component, the first and second planar sealing structures being separated from each other by a sealing gap and bounding the sealing gap in a planar manner,
   the first planar sealing structure being abradable by the second planar sealing structure, and the second planar sealing structure being abradable by the first planar sealing structure.

2. The device according to claim 1, wherein at least one of the first sealing structure and the second sealing structure is a honeycomb structure.

3. The device according to claim 1, wherein the first abradable planar sealing structure arranged on the rotating component is a honeycomb structure.

4. The device according to claim 1, wherein both of the first sealing structure and the second sealing structure are honeycomb structures.

* * * * *